(12) United States Patent
Wang et al.

(10) Patent No.: US 12,248,678 B2
(45) Date of Patent: Mar. 11, 2025

(54) METHOD, ELECTRONIC DEVICE, AND COMPUTER PROGRAM PRODUCT FOR ADJUSTING PERFORMANCE OF STORAGE SYSTEM

(71) Applicant: DELL PRODUCTS L.P., Round Rock, TX (US)

(72) Inventors: Cheng Wang, Beijing (CN); Bing Liu, Tianjin (CN)

(73) Assignee: DELL PRODUCTS L.P., Round Rock, TX (US)

(*) Notice: Subject to any disclaimer, the term of this patent is extended or adjusted under 35 U.S.C. 154(b) by 43 days.

(21) Appl. No.: 18/295,453

(22) Filed: Apr. 4, 2023

(65) Prior Publication Data

US 2024/0281140 A1 Aug. 22, 2024

(30) Foreign Application Priority Data

Feb. 17, 2023 (CN) .......................... 202310135271.7

(51) Int. Cl.
*G06F 12/00* (2006.01)
*G06F 3/06* (2006.01)

(52) U.S. Cl.
CPC ............ *G06F 3/061* (2013.01); *G06F 3/0634* (2013.01); *G06F 3/0683* (2013.01)

(58) Field of Classification Search
None
See application file for complete search history.

(56) References Cited

U.S. PATENT DOCUMENTS

2020/0201759 A1* 6/2020 Korzh ................... G06F 3/0611
2020/0264787 A1* 8/2020 Abdul Kadar ........ G06F 3/0653
2020/0310886 A1* 10/2020 Rajamani ............ G06F 9/45558

* cited by examiner

*Primary Examiner* — Daniel D Tsui
(74) *Attorney, Agent, or Firm* — WOMBLE BOND DICKINSON (US) LLP

(57) ABSTRACT

A method includes: generating a machine learning model based on historical operation data of the storage system, the storage system being used for backing up and restoring data in a client. The method further includes: determining, by the machine learning model, input/output (I/O) utilization of the storage system for a future time period. The method further includes: determining, in response to determining that the I/O utilization exceeds a predetermined threshold at a first time instance in the future, an I/O capacity corresponding to the determined I/O utilization based on the determined I/O utilization. The method further includes: adjusting the performance of the storage system based on the determined I/O capacity. The embodiments of the present disclosure enable more effective resolution of the I/O spike problem without interrupting data backup or restoration services.

20 Claims, 6 Drawing Sheets

METHOD, ELECTRONIC DEVICE, AND COMPUTER PROGRAM PRODUCT FOR ADJUSTING PERFORMANCE OF STORAGE SYSTEM

CROSS-REFERENCE TO RELATED APPLICATION

This patent application claims priority, under 35 U.S.C. § 119, of Chinese Patent Application No. 202310135271.7, filed Feb. 17, 2023, which is incorporated by reference in its entirety.

TECHNICAL FIELD

Embodiments of the present disclosure relate to the field of computers, and more particularly, to a method, an electronic device, and a computer program product for adjusting performance of a storage system.

BACKGROUND

Block storage is a form of cloud storage for storing data, typically on a storage area network (SAN). Data is stored in blocks, wherein the storage by each block is conducted separately according to the efficiency requirements of the SAN. Each block is assigned a unique address, which is then used by a management application controlled by an operating system of a server to retrieve data upon request and compile the data into a file. Block storage provides efficiency because blocks can be distributed across multiple systems and can even be configured to work with different operating systems.

Block storage is an efficient and flexible cloud storage option for enterprises that require high-performance workloads or require managing large files. However, block storage is more resource intensive, and although block storage is easily scalable, block storage is more expensive due to the high resource consumption of the SAN. In addition, management of block storage requires more specialized management and maintenance training, which increases the overall cost.

SUMMARY OF THE INVENTION

The embodiments of the present disclosure provide a method, an electronic device, and a computer program product for adjusting performance of a storage system.

According to a first aspect of the present disclosure, a method for adjusting performance of a storage system is provided. The method includes: generating a machine learning model based on historical operation data of the storage system, the storage system being used for backing up and restoring data in a client. The method further includes: determining, by the machine learning model, input/output (I/O) utilization of the storage system for a future time period. The method further includes: determining, in response to determining that the I/O utilization exceeds a predetermined threshold at a first time instance in the future, an I/O capacity corresponding to the determined I/O utilization based on the determined I/O utilization. The method further includes: adjusting the performance of the storage system based on the determined I/O capacity.

According to a second aspect of the present disclosure, an electronic device is further provided. The electronic device includes a processor and a memory coupled to the processor, wherein the memory has instructions stored therein, and the instructions, when executed by the processor, cause the device to execute actions. The actions include: generating a machine learning model based on historical operation data of the storage system, the storage system being used for backing up and restoring data in a client. The actions further include: determining, by the machine learning model, input/output (I/O) utilization of the storage system for a future time period. The actions further include: determining, in response to determining that the I/O utilization exceeds a predetermined threshold at a first time instance in the future, an I/O capacity corresponding to the determined I/O utilization based on the determined I/O utilization. The actions further include: adjusting the performance of the storage system based on the determined I/O capacity.

According to a third aspect of the present disclosure, a computer program product is provided, wherein the computer program product is tangibly stored on a computer-readable medium and includes computer-executable instructions, and the computer-executable instructions, when executed by a device, cause the device to execute the method according to the first aspect.

The Summary of the Invention part is provided to introduce the selection of concepts in a simplified form, which will be further described in the Detailed Description below. The Summary of the Invention part is neither intended to identify key features or principal features of the claimed subject matter, nor intended to limit the scope of the claimed subject matter.

BRIEF DESCRIPTION OF THE DRAWINGS

The above and other features, advantages, and aspects of embodiments of the present disclosure will become more apparent in conjunction with the accompanying drawings and with reference to the following detailed description. In the accompanying drawings, identical or similar reference numerals represent identical or similar elements, in which.

In all the accompanying drawings, identical or similar reference numerals indicate identical or similar elements.

DETAILED DESCRIPTION

Figure 1:
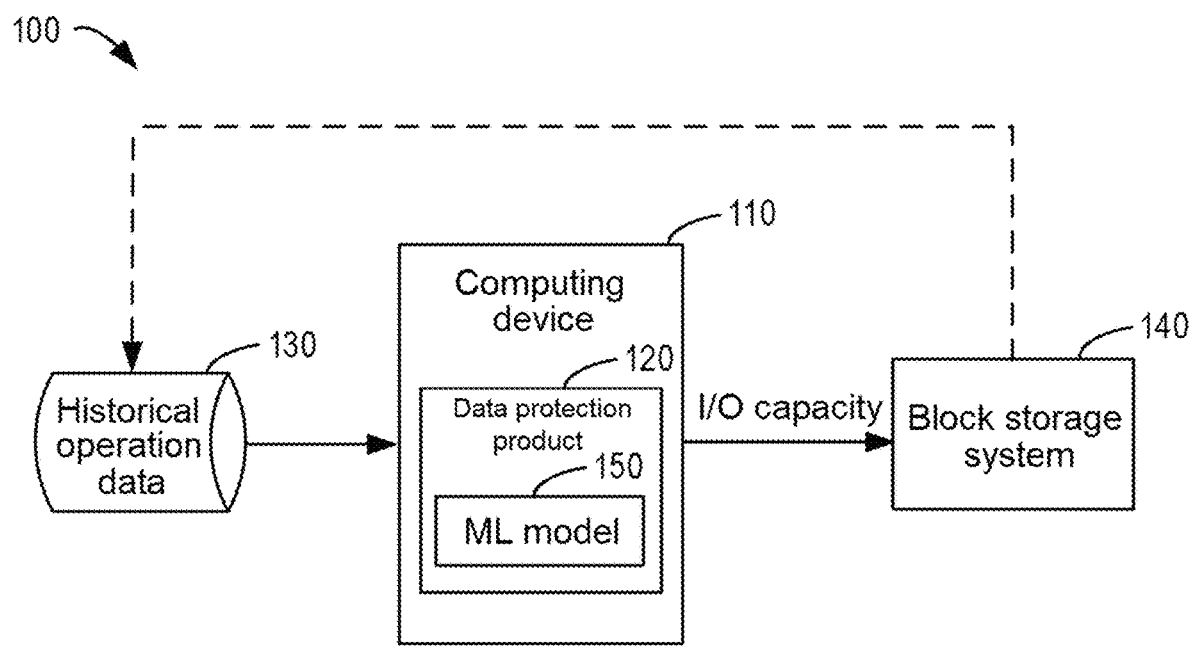
FIG. 1 illustrates a schematic diagram of an example environment in which embodiments of the present disclosure can be implemented.

The embodiments of the present disclosure will be described in more detail below with reference to the accompanying drawings. Although the accompanying drawings show some embodiments of the present disclosure, it should be understood that the present disclosure may be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for exemplary purposes only, and are not intended to limit the protection scope of the present disclosure.

In the description of the embodiments of the present disclosure, the term "include" and similar terms thereof should be understood as open-ended inclusion, i.e., "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below. In addition, all specific numerical values herein are examples, which are provided only to aid in understanding, and are not intended to limit the scope.

In the field of data storage, some data protection products can help users to save, back up, or restore data in the cloud, and even include deduplication, replication, data integrity, and encryption functions. In a public cloud, tasks such as backup increase the input/output (I/O) load on a block storage system. When an I/O spike arrives, it will lead to poor performance of the data protection product or even system crashes.

In research, it is found that in the conventional technology, in order to overcome I/O bottlenecks, a user may reconfigure a data protection product with higher-end virtual hardware, but this approach has high resource consumption and is not a good approach if I/O stress lasts for a short period of time.

One reason why reconfiguring the data protection product with higher-end virtual hardware is not a good approach is that: data protection products running in a public cloud utilize block storage services to persistently save metadata. The I/O capability of a disk is carefully designed to support most workload patterns. However, in a production environment, certain workloads may cause I/O spikes that then put I/O stress on the metadata disk in some data protection products. An I/O throttling mechanism is often triggered to relieve the I/O stress on the disk, but this will lead to poor performance. Especially in the case of a sharp increase in I/O, I/O throttling may not work properly, and even the data protection product may become chaotic, leading to service interruptions.

Another reason why reconfiguring the data protection product with higher-end virtual hardware is not a good approach is that: usually, when the I/O of the data protection product cannot meet the user's requirements, a service engineer may help the customer to reconfigure the virtual hardware of the data protection product to reach a higher level of specification, which includes reconfiguring the block storage to a higher-performance disk type, and upgrading to a higher-end data protection product model. However, performing either of the above methods requires shutting down the data protection product. On the other hand, if the I/O stress is temporary and only occurs for a short period of time, as reconfiguring to higher virtual hardware is irreversible, this will result in more resource consumption for the customer.

With this in mind, the method of the present disclosure provides a method for adjusting performance of a block storage system. The method is capable of monitoring and analyzing statistical information of runtime I/O workload. Based on the workload analysis, a data protection product dynamically scales up/down the I/O performance of a disk to accommodate I/O spikes without interrupting a service. Compared with upgrading the system configuration to a higher configuration, users can cope with I/O spikes by temporarily increasing the I/O capacity of the disk in the data protection product and recovering to the baseline configuration after I/O spikes.

This helps the data protection product to handle I/O spikes efficiently without affecting system performance. In addition, it costs the customer less than reconfiguring the data protection product to a higher-end model. In addition, the data unavailable (DU) situation is also prevented so that the service is not interrupted throughout the I/O spike as well as the I/O scaling up/down of the disk.

FIG. 1 illustrates a schematic diagram of an example environment 100 in which embodiments of the present disclosure can be implemented. The present disclosure will be described taking a block storage system as an example, and the present disclosure is also applicable to any storage system. The storage system can store the deduplicated data for a user, which may include virtual machine, block storage, and object storage. The block storage may be block storage, including a plurality of disks (block disks), which have system disks, metadata disks, etc. The present disclosure can improve the performance of a block storage module (including a plurality of block disks therein) in the system, thereby improving the IO processing capability of the entire system.

In the environment 100, a computing device 110 (e.g., a computing system or server) has a data protection product 120 installed thereon. The data protection product 120 is connected to a block storage system 140. The data protection product 120 can acquire historical operation data 130 of the block storage system 140. In some embodiments, the historical operation data 130 may come directly from the block storage system 140. In some embodiments, the historical operation data 130 may be acquired from other storage devices.

The data protection product 120 includes a machine learning model 150. The machine learning model 150 may analyze the historical operation data 130 (e.g., historical and runtime I/O loads of the block storage system 140) and predict future I/O loads to determine when an I/O spike is coming. The data protection product 120 may decide, according to the results of the I/O load analysis, whether to scale up or scale down the I/O performance of the disks of the block storage system 140 to accommodate I/O spikes.

If the data protection product 120 decides to scale up or scale down the I/O performance of the disks of the block storage system 140, it may determine, based on the prediction results, the I/O capacity that will meet the needs of the future I/O spikes. The data protection product 120 can send the I/O capacity along with instructions to the block storage system 140 for adjusting the I/O performance of the block storage system 140.

Figure 2:
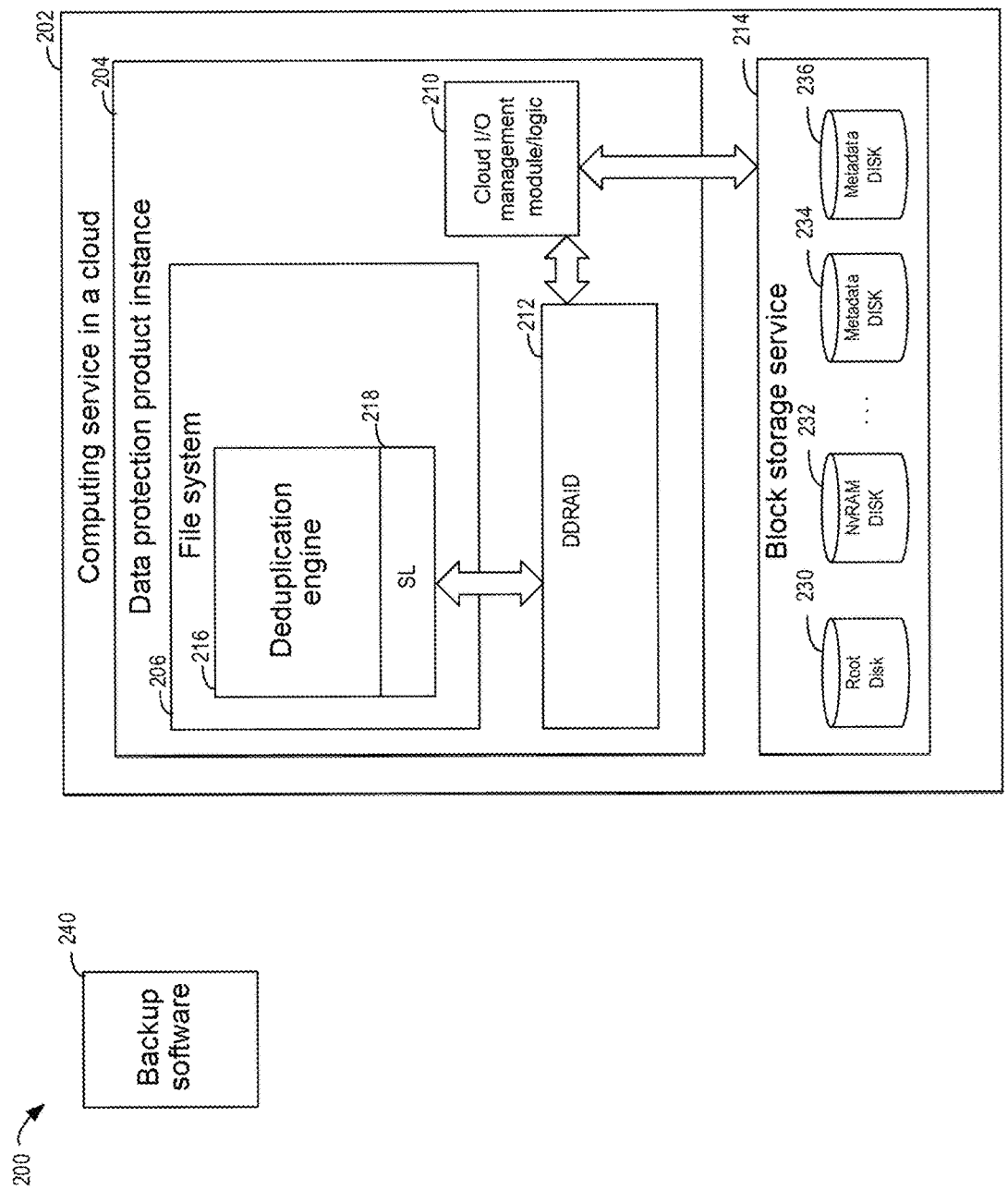
FIG. 2 schematically illustrates a schematic diagram of a product framework according to an example implementation of the present disclosure.

FIG. 2 schematically illustrates a schematic diagram of a product framework 200 according to an example implementation of the present disclosure. As shown in FIG. 2, the product framework 200 is included in backup software 240. In some embodiments, the data protection product may be run in a virtual machine of the backup software 240. The backup software 240 may also provide a computing service 202. The computing service 202 includes a data protection product instance 204. The data protection product instance 204 includes a file system 206. The file system 206 also includes a deduplication engine 216. The deduplication engine 216 is used to analyze and identify whether data from users is duplicated and to produce duplicate data as metadata. The deduplicated user data is saved to a distributed data redundant array of independent disks (DDRAID) 212 via a storage layer (SL) 218.

As an example, the block storage service 214 illustrates details of disk types for the block storage service, for example, a root disk 230, a non-volatile random access memory (NvRAM) disk 232, a metadata disk 234, and a metadata disk 236.

In some embodiments, the data protection product instance 204 may include a cloud I/O management module/logic 210. The cloud I/O management module/logic 210 may be connected to the DDRAID 212 and the block storage service 214. The cloud I/O management module/logic 210 may be used to analyze the I/O load of the block storage system, determine the I/O capacity, and issue instructions for adjusting the I/O performance.

Figure 3:
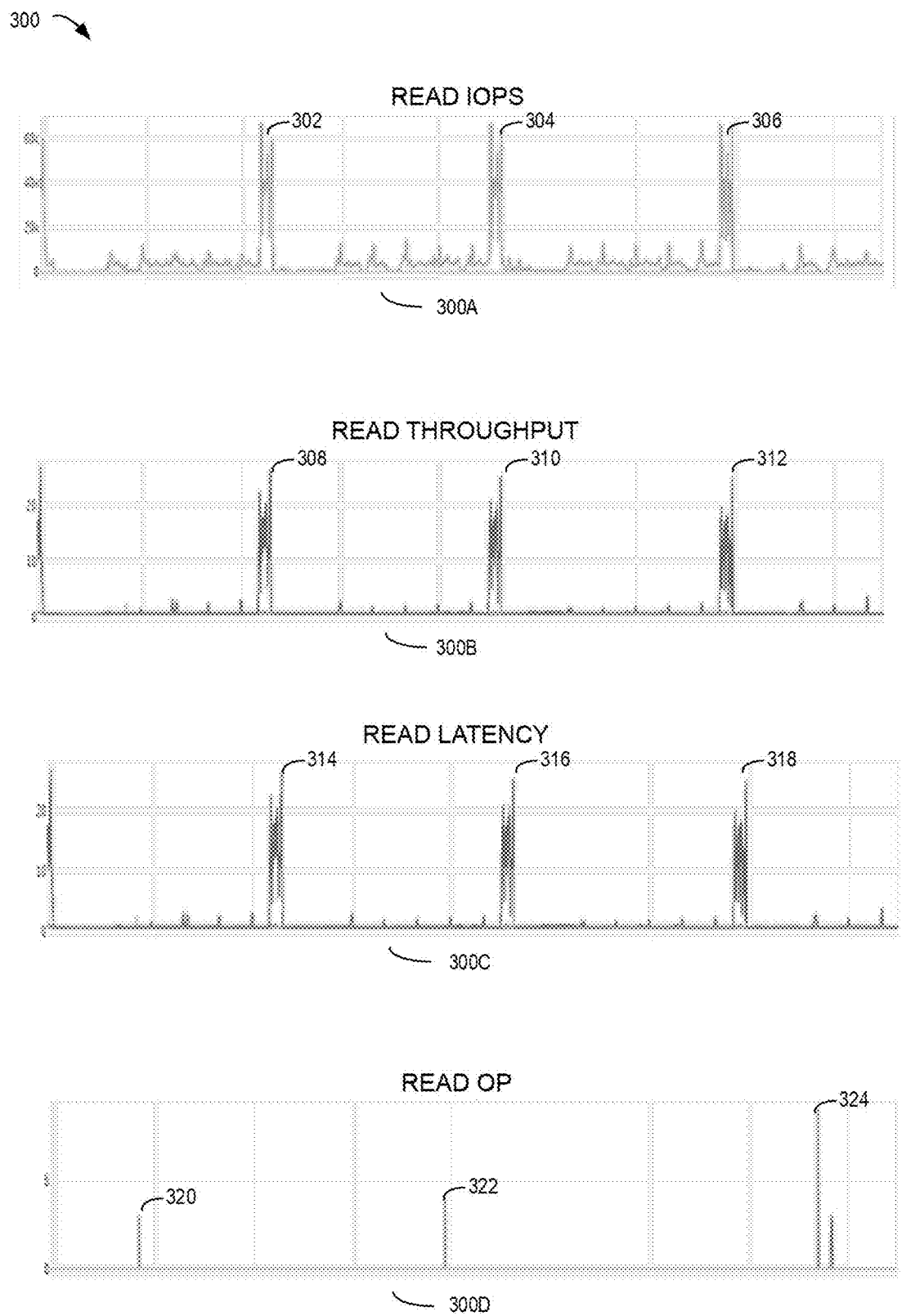
FIG. 3 schematically illustrates a schematic diagram of I/O statistical data according to an example implementation of the present disclosure.

FIG. 3 schematically illustrates a schematic diagram of I/O statistical data 300 according to an example implementation of the present disclosure. FIG. 3 illustrates disk performance data statistics for a typical data protection product regarding reading. From FIG. 3, it can be seen that the characteristic of backup activities is as follows: the I/O stress is high on weekends while the I/O load is low on weekdays.

Curve 300A illustrates the variation in the read input/output operations per second (READ IOPS) for a user backup task. It can be seen that spike 302, spike 304, and spike 306 all occur regularly and are concentrated on the weekend of each week.

Curve 300B illustrates the variation in the read throughput (READ THROUGHPUT) for the user backup task. It can be seen that the rule of spike 308, spike 310, and spike 312 is consistent with that of the curve 300A, which all appear on the weekend of each week.

Curve 300C illustrates the variation in the read latency (READ LATENCY) for the user backup task. It can be seen that the rule of spike 314, spike 316, and spike 318 is consistent with those of the curves 300A and 300B, which all occur on the weekend of each week.

Curve 300D illustrates the variation in the number of read operations (READ OPs) for the user backup task. It can be seen that spike 320, spike 322, and spike 324 also all occur on the weekend of each week, but at earlier time than the curves 300A, 300B, and 300C. This may be due to a request for a backup task.

Figure 4:
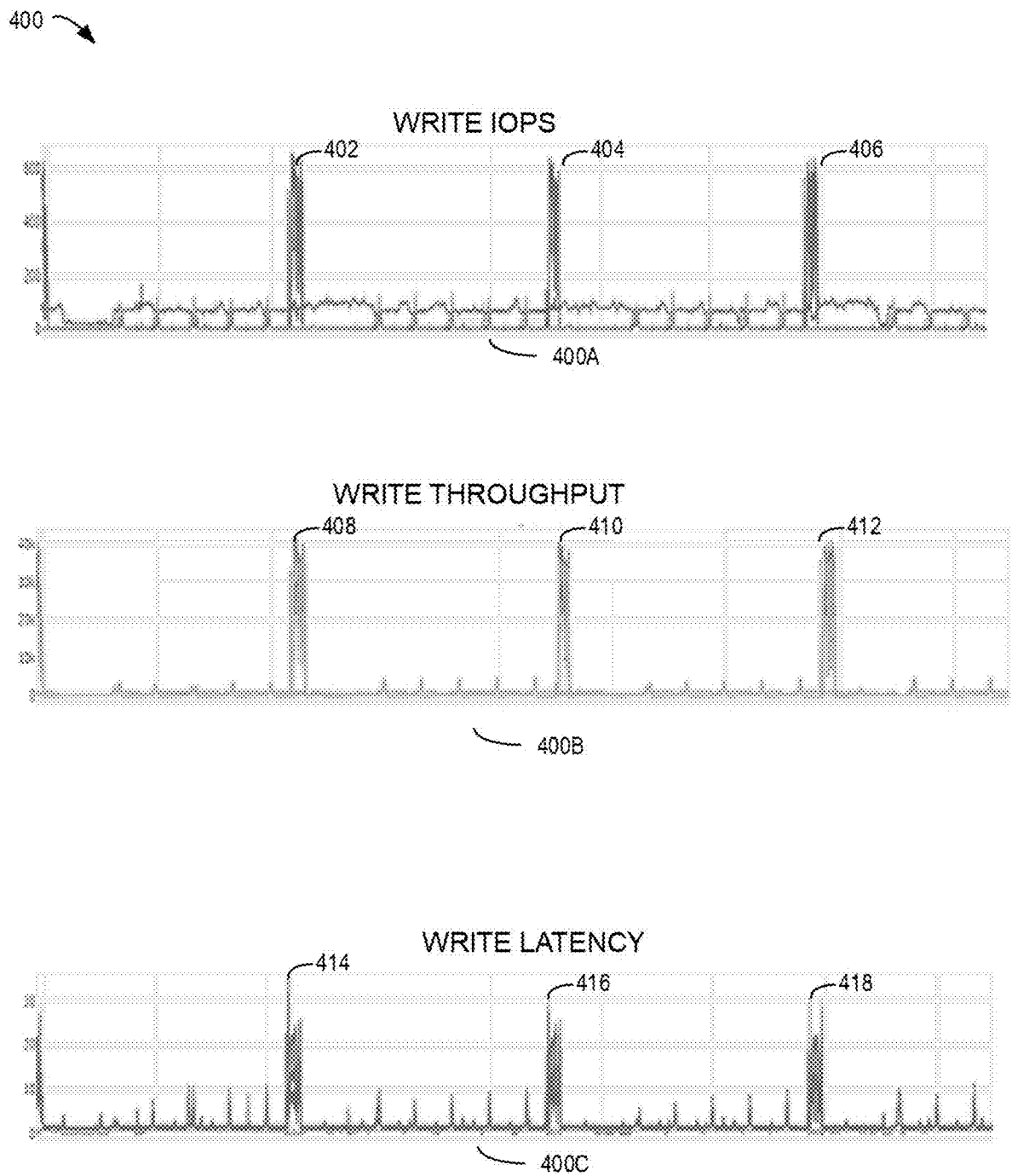
FIG. 4 schematically illustrates a schematic diagram of I/O statistical data according to an example implementation of the present disclosure.

FIG. 4 schematically illustrates a schematic diagram of I/O statistical data 400 according to an example implementation of the present disclosure. FIG. 4 illustrates disk performance data statistics for a typical data protection product regarding writing. From FIG. 4, it can also be seen that the characteristic of backup activities is as follows: the I/O stress is high on weekends while the I/O load is low on weekdays.

Curve 400A illustrates the variation in the write input/output operations per second (WRITE IOPS) for a user backup task. It can be seen that spike 402, spike 404, and spike 406 all occur regularly and are concentrated on the weekend of each week.

Curve 400B illustrates the variation in the write throughput (WRITE THROUGHPUT) for the user backup task. It can be seen that the rule of spike 408, spike 408, and spike 410 is consistent with that of the curve 400A, which all appear on the weekend of each week.

Curve 400C illustrates the variation in the write latency (WRITE LATENCY) for the user backup task. It can be seen that the rule of spike 414, spike 416, and spike 418 is consistent with those of the curves 400A and 400B, which all occur on the weekend of each week.

Therefore, the present disclosure proposes a method for adjusting performance of a block storage system. The method predicts the spike of I/O based on the analysis of historical operation data of the block storage system, and reconfigures the I/O performance of the disk (including adjusting the disk type, IOPS, and throughput) prior to the arrival of the spike of I/O. The I/O performance can be restored to the baseline again after the spike of I/O has passed. This allows the problem of I/O spikes to be addressed more effectively with lower resource consumption, while not interrupting the backup service.

Figure 5:
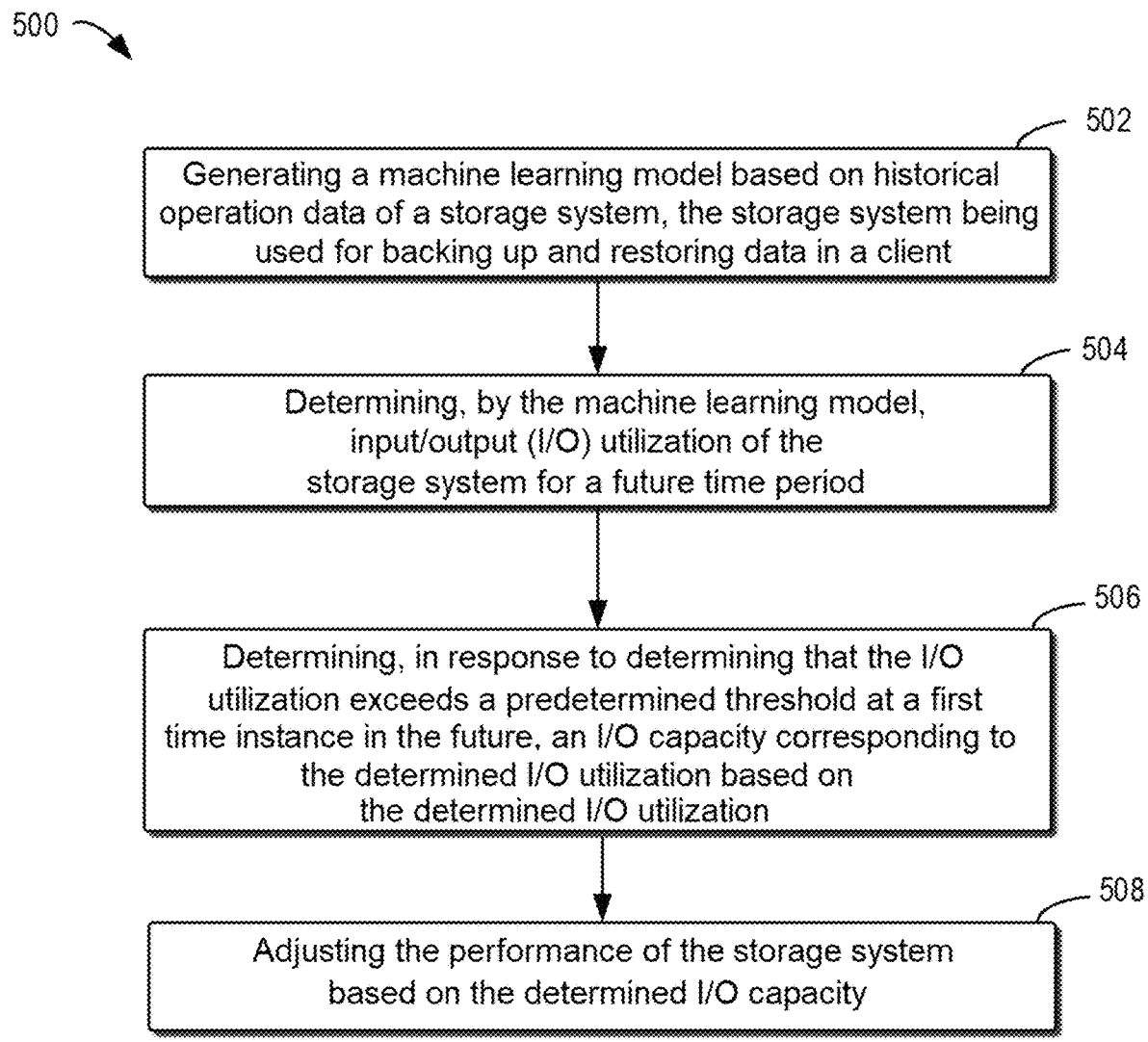
FIG. 5 schematically illustrates a flow chart of a method for adjusting performance of a storage system according to an example implementation of the present disclosure.

FIG. 5 schematically illustrates a flow chart of a method 500 for adjusting performance of a block storage system according to an example implementation of the present disclosure. The method 500 will be described below in conjunction with FIG. 1 and FIG. 5, and using a block storage system as an example.

At block 502, a machine learning model 150 is generated based on historical operation data 130 of the storage system, the storage system being used for backing up and restoring data in a client. As an example, the data protection product 120 acquires historical operation data 130. Based on the historical operation data 130, the machine learning model 150 may be trained. The trained machine learning model 150 has the capability of analyzing the I/O load of the block storage system 140, as well as the capability of predicting the spike of I/O load in future time periods. In some embodiments, a machine learning model such as a random forest or decision tree may be used as the basic model.

In some embodiments, the historical operation data acquired includes IOPS and I/O throughput. The I/O utilization set may be calculated based on the respective average values of the IOPS and I/O throughput, as well as the respective upper limits of IOPS and I/O throughput currently allowed for the block storage system. The calculated I/O utilization is used as the original dataset O. Assuming that the number of input samples (I/O utilization) is N, then the number of sampled samples is also N. The bootstrap method is applied to randomly extract k new bootstrap sample sets with replacement and construct k decision trees from them, with samples un-sampled each time forming K out-of-bag data.

In some embodiments, from the original dataset O, sampling with replacement is conducted to construct sub-datasets S. The sub-datasets S have the same amount of data as the original dataset, elements of different sub-datasets S can be duplicated, and elements in the same sub-dataset S can also be duplicated. Secondly, the sub-datasets S are used to construct sub-decision trees T, this data is put into a sub-decision tree T, and each sub-decision tree T outputs a result. In some embodiments, if there is new data for which classification results need to be obtained by means of the random forest, the output results of the random forest can be obtained by voting on judgment results of the sub-decision trees T. Suppose that there are 3 sub-decision trees T in the random forest, 2 of which have the classification result of class A and 1 has the classification result of class B, then the classification result of the random forest is class A.

In some embodiments, similar to the random selection of the dataset O, each splitting process for the sub-decision trees T of the random forest (i.e., at each branch node) does not use all the features to be selected, but instead randomly selects a certain number of features from all the features to be selected (for example, one-third, the smaller the value, the more robust the model, extraction without replacement), followed by the selection of the optimal features among the randomly selected features. This enables the decision trees in the random forest to all be different from each other, thereby improving the system diversity and thus the classification performance.

At block 504, I/O utilization of the storage system for a future time period is determined by the machine learning model. As an example, the machine learning model 150, after acquiring the historical operation data 130 of the block storage system 140, can predict the likely I/O utilization of the block storage system 140 over a future time period. In some embodiments, the I/O utilization is expressed in terms of busyness. For example, the predicted I/O load is a percentage of the maximum I/O load allowed by the block storage system 140.

In some embodiments, determining I/O utilization of the block storage system 140 for a future time period by the machine learning model 150 may include: determining the I/O utilization of the block storage system 140 for the future time period based on I/O statistical data. In some embodiments, the I/O utilization may include one or more of the following: uptake load, data restoration load, internal garbage collector (GC), GC scheduling policy, file verification, file system cleanup, workload patterns, and metadata distribution.

In some embodiments, the machine learning model 150 may determine the I/O utilization based on the IOPS and the I/O throughput. The machine learning model 150 determines the I/O utilization of the block storage system 140 for a future time period based on the I/O utilization.

In some embodiments, the machine learning model 150 may estimate the I/O utilization for a future time period based on the determined I/O utilization and the metadata distribution. For example, when the metadata is distributed across multiple regions, most of which are at dispersed physical locations, the predicted I/O utilization can be high. When the metadata is distributed across multiple regions, most of which are at concentrated physical locations, the predicted I/O utilization can be low.

In some embodiments, determining the I/O utilization of the block storage system 140 for a future time period by the machine learning model 150 may include predicting, using the machine learning model 150 and based on the I/O statistical data, the time when a spike of an I/O load of the block storage system 140 will occur in the future time period and the magnitude of the spike.

Continuing with the above example, when the metadata is distributed across multiple regions, most of which are at dispersed physical locations, the duration of the predicted I/O utilization is long. Therefore, the duration of the spike can be longer, and the magnitude of the spike can be larger. When the metadata is distributed across multiple regions, most of which are at concentrated physical locations, the duration of the predicted I/O utilization is short. Therefore, the duration of the spike can be shorter and the magnitude of the spike can be smaller.

In some embodiments, the machine learning model 150 can output a segment of curve formed by connecting a plurality of discrete points. This curve represents the continuous change in the I/O load for the future time period. In this way, it is possible to determine from this curve the size of an I/O spike and the time when it occurs.

In some embodiments, the machine learning model 150 can predict the magnitude of the I/O utilization at each time instance. Thus, these predicted values can be connected into a curve. By observing the vertices of this curve, the occurrence of I/O spikes in future time can be known. In some embodiments, instead of drawing such a curve, the occurrence of I/O spikes can be determined by means of a ranking method.

In some embodiments, the historical operation data acquired by the machine learning model 150 may include the average IO utilization for each day over the past N days, where N is an integer. If it can be determined that a user's backup cycle is around one week, in this case, let N=7. Let the machine learning model 150 focus on the most recent week.

In some embodiments, let N=14, 21, or 28, so that the machine learning model 150 can sense longer periods (e.g., 2, 3, or 4 weeks) while assigning higher weights to the features of data for the most recent week in order to detect trends of changes in the I/O load in a timely manner. For example, a weight of 0.6 is assigned to historical data from the first week, and a weight of 0.4 is assigned to historical data from the second week, wherein the historical data from the first week arrived at the time of training earlier than the historical data from the second week arrived at the time of training. In some embodiments, the target of the machine learning model 150 may be the average utilization of I/O for the second day. For example, if N=7, the target is the IO utilization on day 8.

At block 506, in response to determining that the I/O utilization exceeds a predetermined threshold at a first time instance in the future, an I/O capacity corresponding to the determined I/O utilization is determined based on the determined I/O utilization. As an example, it is assumed that the length of the future time period is 1 day, the first time instance is 3:00 a.m., and the predetermined threshold is 90%. Then, if the I/O utilization at 3:00 a.m. on day 1 in the future, as determined by the machine learning model 150, is 95%, it means that the I/O utilization at the first time instance exceeds the predetermined threshold. At this point, the I/O capacity corresponding to the I/O utilization of 95% can be calculated.

In some embodiments, a modification of the disk type to a higher-performance disk type or a higher IOPS or throughput can be requested. Considering that the value of the IOPS or throughput of the initial disk before adjusting may be limited by the upper limit of the current disk type, the predicted I/O utilization may be lower than the actual demand of the workload. Therefore, the present disclosure proposes expected buffering parameters.

In some embodiments, an adjusted IOPS may be determined based on the I/O utilization, a current IOPS of the block storage system 140, and a first expected buffering parameter, wherein the first expected buffering parameter indicates the extent to which the IOPS is changed, i.e., how good a boost in IOPS is desired.

Equation (1) illustrates how the I/O capacity is determined.

$$C = U * L1 * (1 + a1) \tag{1}$$

where C denotes the I/O capacity, U denotes the predicted utilization, L1 denotes the current IOPS upper limit, and a1 denotes the first expected buffering parameter.

In some embodiments, an adjusted I/O throughput may be determined based on the I/O utilization, a current I/O throughput of the block storage system 140, and a second expected buffering parameter, wherein the second expected buffering parameter indicates the extent to which the I/O throughput is changed, i.e., how good a boost in I/O throughput is desired.

Equation (2) illustrates how the I/O capacity is determined.

$$C = U * L2 * (1 + a2) \qquad (2)$$

where C denotes the I/O capacity, U denotes the predicted utilization, L2 denotes the current throughput upper limit, and a2 denotes the second expected buffering parameter.

At block 508, the performance of the storage system is adjusted based on the determined I/O capacity. Table 1 illustrates an example of adjusting the performance of block storage system 140.

TABLE 1

| Disk Type | IOPS | Throughput (MiB/s) | Note |
|---|---|---|---|
| gp3 | Min: 3000 | Min: 125 | Baseline |
| | ... | ... | Adjustable within this range |
| | Max: 15000 | Max: 1000 | Maximum upper limit |
| io2 | Max: 64000 | Max: 1000 | |
| io1 | Max: 64000 | Max: 1000 | |

As can be seen, Table 1 illustrates example I/O specifications for the block storage system 140. The I/O specification starts from a baseline value (with a default IOPS of 3000 and a default throughput of 125 MiB/s) and can be increased within a certain range. The upper limit of the I/O performance allowed by the block storage system 140 is affected by the sizes of individual disks, so the adjustment of the I/O performance should not exceed the upper limit.

In some embodiments, if it is determined that the predicted I/O utilization is less than the current I/O utilization, then the I/O capacity of the block storage system for a future time period can be determined based on the determined I/O utilization and the current I/O capacity of the block storage system 140.

As an example, unlike the policy for increasing the I/O performance, scaling down the I/O performance does not involve a throttling policy for the maximum IOPS/throughput. Therefore, the prediction results can be used directly to request new IOPS (or throughput). Equations (3) and (4) illustrate how the I/O capacity is determined in this case:

$$C = U * L1 \qquad (3)$$
$$C = U * L2 \qquad (4)$$

where C denotes the I/O capacity, U denotes the predicted utilization, L1 denotes the current IOPS upper limit, and L2 denotes the current throughput upper limit.

In some embodiments, after the spike in the I/O utilization, the adjusted I/O capacity of the block storage system 140 is adjusted back to the default I/O capacity, i.e., back to the baseline. In this way, it is possible to provide high I/O performance only at spike time instances and provide baseline I/O performance during normal times. Thus, it is possible to reduce the overall cost to a customer on block storage with this flexible scaling up and down policy compared to fixedly selection of higher specification services.

In some embodiments, a corresponding disk in the block storage system 140 can be selected, wherein the type of the corresponding disk satisfies the I/O capability. An I/O capacity of the selected disk is taken as the I/O capacity of the storage system at the first time instance. As an example, if two disks are included in the block storage system, it is possible to adjust the I/O performance of only one of the disks if circumstances permit and the demand can be met.

In some embodiments, the first disk in the block storage system 140 may be selected, and the I/O performance of the first disk may be adjusted to be the same as the I/O capability. In some embodiments, the second disk in the block storage system 140 may be selected, and the I/O performance of the second disk may be adjusted to be the same as the I/O capacity, and so on, the process continues until the I/O load at the spike can be tolerated. This allows the I/O performance to be adjusted at the granularity of individual disks, and thus a greater flexibility, thus further reducing the resource consumption of the user.

In some embodiments, it is also possible to acquire from the client a backup schedule of the user for backing up data in the block storage system 140, as well as the user's priority. Based on the user's priority, input/output (I/O) specifications of the block storage system 140 that can be assigned to the backup are determined. A time period in which a spike of the I/O load of the block storage system 140 occurs is determined based on the backup schedule. Based on the I/O specifications and the time period, the I/O performance of the block storage system is improved. In this way, the magnitude and time of occurrence of an I/O spike can be more accurately predicted.

In some embodiments, if the historical operation data 130 is not very regular and is difficult to predict, the input/output (I/O) load set of the block storage system 140 can also be monitored over a number of time periods. In some embodiments, changes in the I/O load of the block storage system 140 can be determined based on the I/O load. In some embodiments, the I/O load for a future time period reaching a predetermined threshold can be determined based on the changes in the I/O load. In some embodiments, the I/O performance of the block storage system 140 can be adjusted based on the I/O load for that future time period.

By implementing the method 500, it is possible to help the data protection product to handle I/O spikes effectively without impacting system performance. In addition, it reduces the resource consumption of the user compared to reconfiguring the data protection product to a higher-end model. In addition, the service is not interrupted throughout the I/O spike as well as the I/O scaling up/down of the disk, thus enhancing the user experience.

Figure 6:
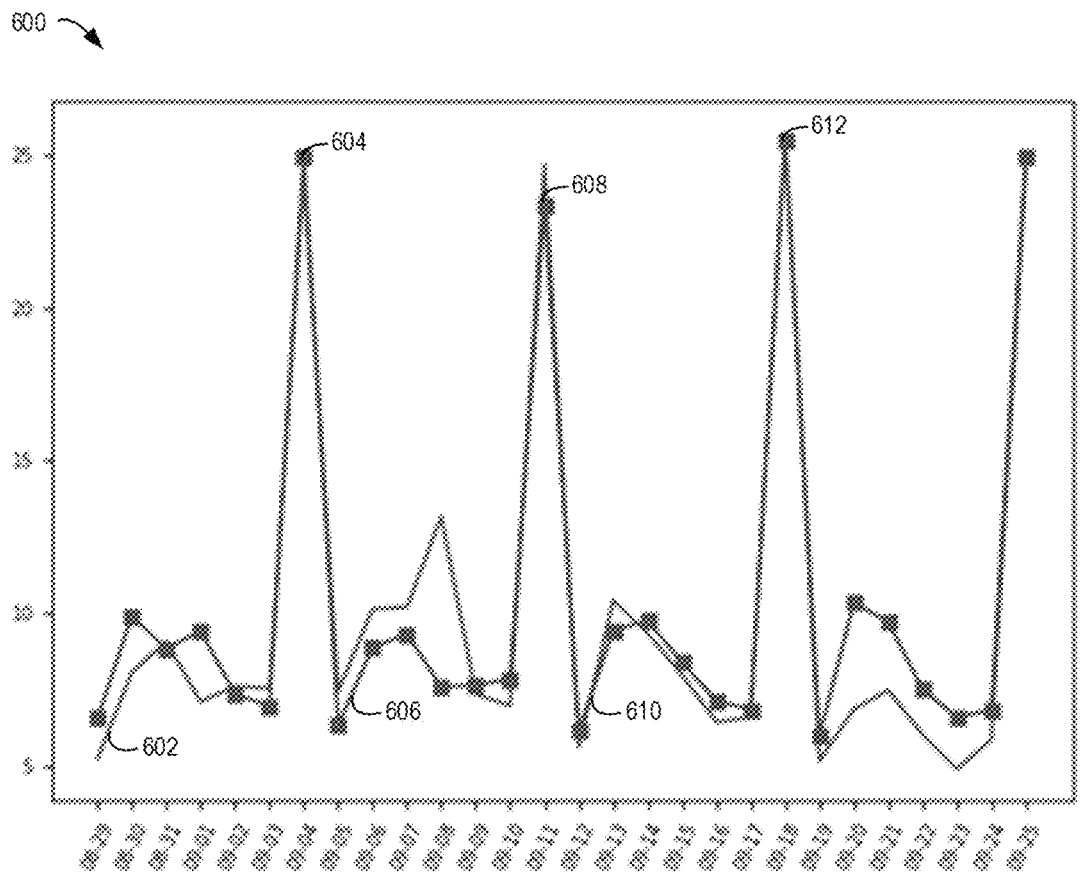
FIG. 6 schematically illustrates a schematic diagram of prediction results of I/O utilization according to an example implementation of the present disclosure.

FIG. 6 schematically illustrates a schematic diagram of prediction results of I/O utilization according to an example implementation of the present disclosure. As shown in FIG. 6, curve 602, curve 606, and curve 610 represent changes in the historical I/O utilization over time. Spike 604, spike 608, and spike 612 represent the predicted I/O spikes.

It can be seen that spike 602 occurred on September 4, spike 608 occurred on September 11, and spike 612 occurred on September 18. Therefore, spikes in the data backup service occur on a one-week cycle. Such prediction results are consistent with the previous cases as discussed in FIG. 3 and FIG. 4. Therefore, the predicted results are accurate.

Figure 7:
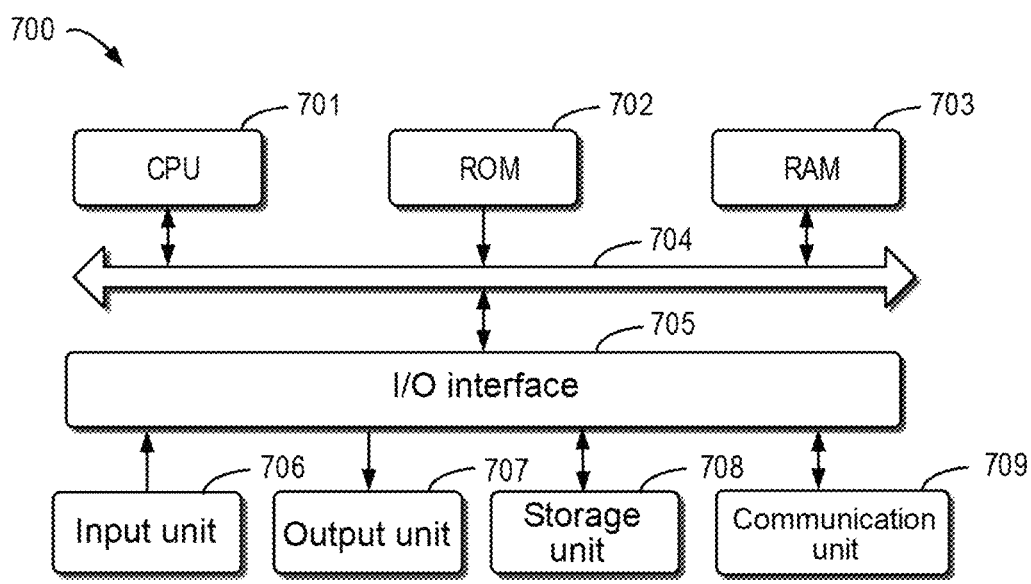
FIG. 7 schematically illustrates a block diagram of a device for adjusting performance of a storage system according to an example implementation of the present disclosure.

FIG. 7 illustrates a schematic block diagram of a device 700 that may be used to implement embodiments of the present disclosure. The device 700 may be a device or apparatus as described in embodiments of the present disclosure. As shown FIG. 7, the device 700 includes a central processing unit (CPU) 701, which may execute various appropriate actions and processing in accordance with computer program instructions stored in a read-only memory (ROM) 702 or computer program instructions loaded from a storage unit 708 into a random access memory (RAM) 703. Various programs and data required for the operation of the device 700 may also be stored in the RAM 703. The CPU 701, the ROM 702, and the RAM 703 are connected to each other through a bus 704. An input/Output (I/O) interface 705 is also connected to the bus 704. Although not shown in FIG. 7, the device 700 may also include a co-processor.

A plurality of components in the device 700 are connected to the I/O interface 705, including: an input unit 706, such as a keyboard and a mouse; an output unit 707, such as various types of displays and speakers; a storage unit 708, such as a magnetic disk and an optical disc; and a communication unit 709, such as a network card, a modem, and a wireless communication transceiver. The communication unit 709 allows the device 700 to exchange information/data with other devices via a computer network, such as the Internet, and/or various telecommunication networks.

The various methods or processes described above can be performed by the CPU 701. For example, in some embodiments, the method may be implemented as a computer software program that is tangibly included in a machine-readable medium, such as the storage unit 708. In some embodiments, part or all of the computer program may be loaded and/or installed onto device 700 via the ROM 702 and/or the communication unit 709. When the computer program is loaded into the RAM 703 and executed by the CPU 701, one or more steps or actions of the methods or processes described above may be performed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, other programmable data processing apparatuses, or other devices, so that a series of operating steps may be executed on the computer, the other programmable data processing apparatuses, or the other devices to produce a computer-implemented process, such that the instructions executed on the computer, the other programmable data processing apparatuses, or the other devices may implement the functions/actions specified in one or more blocks in the flow charts and/or block diagrams.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, and the module, program segment, or part of an instruction includes one or more executable instructions for implementing specified logical functions. In some alternative implementations, functions marked in the blocks may also occur in an order different from that marked in the accompanying drawings. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The foregoing description is illustrative rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or the technical improvements to technologies on the market, or to enable other people of ordinary skill in the art to understand the various embodiments disclosed herein.

The invention claimed is:

1. A method for adjusting performance of a storage system, comprising:
generating a machine learning model based on historical operation data of the storage system, the storage system being used for backing up and restoring data in a client;
determining, by the machine learning model, input/output (I/O) utilization of the storage system for a future time period;
determining, in response to determining that the I/O utilization exceeds a predetermined threshold at a first time instance in the future, an I/O capacity corresponding to the determined I/O utilization based on the determined I/O utilization; and
adjusting the performance of the storage system based on the determined I/O capacity.

2. The method according to claim 1, wherein determining, by the machine learning model, I/O utilization of the storage system for a future time period comprises:
determining the I/O utilization of the storage system for the future time period based on I/O statistical data, the I/O statistical data comprising at least one of:
uptake load, data restoration load, internal garbage collector (GC), GC scheduling policy, file verification, file system cleanup, workload patterns, and metadata distribution.

3. The method according to claim 2, wherein determining, by the machine learning model, I/O utilization of the storage system for a future time period further comprises:
predicting, using the machine learning model and based on the I/O statistical data, a time when a spike of an I/O load of the storage system will occur in the future time period and a magnitude of the spike.

4. The method according to claim 1, wherein generating a machine learning model based on historical operation data of the storage system comprises:
selecting first I/O statistical data for a first time period;
selecting second I/O statistical data for a second time period, wherein the first time period is earlier than the second time period relative to a current time;
determining a first weight of the first I/O statistical data and a second weight of the second I/O statistical data, wherein the first weight is less than the second weight; and
training the machine learning model based on the first I/O statistical data, the second I/O statistical data, the first weight, and the second weight.

5. The method according to claim 1, wherein determining, in response to determining that the I/O utilization exceeds a predetermined threshold at a first time instance in the future, an I/O capacity corresponding to the determined I/O utilization based on the determined I/O utilization comprises at least one of:
determining an adjusted input/output operations per second (IOPS) based on the I/O utilization, a current IOPS of the storage system, and a first expected buffering parameter, wherein the first expected buffering parameter indicates an extent to which the IOPS is changed; or
determining an adjusted I/O throughput based on the I/O utilization, a current I/O throughput of the storage system, and a second expected buffering parameter, wherein the second expected buffering parameter indicates an extent to which the I/O throughput is changed.

6. The method according to claim 1, further comprising:
determining that the determined I/O utilization is less than a current I/O utilization; and
in response to determining that the determined I/O utilization is less than the current I/O utilization and based on the determined I/O utilization, determining that the I/O capacity of the storage system at the first time instance comprises:
determining, based on the determined I/O utilization and the current I/O capacity of the storage system, an I/O capacity of the storage system for the future time period.

7. The method according to claim 1, further comprising:
adjusting the adjusted I/O capacity of the storage system back to a default I/O capacity after a spike of the I/O utilization.

8. The method according to claim 1, further comprising:
selecting a corresponding disk in the storage system, wherein the corresponding disk is of a type that satisfies the I/O capacity; and
taking an I/O capacity of the selected disk as the I/O capacity of the storage system at the first time instance.

9. The method according to claim 1, wherein adjusting the performance of the storage system based on the determined I/O capacity comprises:
selecting a first disk in the storage system; and
adjusting an I/O performance of the first disk to be the same as the I/O capability.

10. The method according to claim 9, further comprising:
selecting a second disk in the storage system, wherein the second disk is different from the first disk; and
adjusting an I/O performance of the second disk to be the same as the I/O capability.

11. An electronic device, comprising:
a processor; and
a memory coupled to the processor, wherein the memory has instructions stored therein which, when executed by the processor, cause the device to execute actions comprising:

generating a machine learning model based on historical operation data of a storage system, the storage system being used for backing up and restoring data in a client;

determining, by the machine learning model, input/output (I/O) utilization of the storage system for a future time period;

determining, in response to determining that the I/O utilization exceeds a predetermined threshold at a first time instance in the future, an I/O capacity corresponding to the determined I/O utilization based on the determined I/O utilization; and adjusting the performance of the storage system based on the determined I/O capacity.

12. The electronic device according to claim 11, wherein determining, by the machine learning model, I/O utilization of the storage system for a future time period comprises:

determining the I/O utilization of the storage system for the future time period based on I/O statistical data, the I/O statistical data comprising at least one of:

uptake load, data restoration load, internal garbage collector (GC), GC scheduling policy, file verification, file system cleanup, workload patterns, and metadata distribution.

13. The electronic device according to claim 12, wherein determining, by the machine learning model, I/O utilization of the storage system for a future time period further comprises:

predicting, using the machine learning model and based on the I/O statistical data, a time when a spike of an I/O load of the storage system will occur in the future time period and a magnitude of the spike.

14. The electronic device according to claim 11, wherein generating a machine learning model based on historical operation data of the storage system comprises:

selecting first I/O statistical data for a first time period;

selecting second I/O statistical data for a second time period, wherein the first time period is earlier than the second time period relative to a current time;

determining a first weight of the first I/O statistical data and a second weight of the second I/O statistical data, wherein the first weight is less than the second weight; and training the machine learning model based on the first I/O statistical data, the second I/O statistical data, the first weight, and the second weight.

15. The electronic device according to claim 11, wherein determining, in response to determining that the I/O utilization exceeds a predetermined threshold at a first time instance in the future, an I/O capacity corresponding to the determined I/O utilization based on the determined I/O utilization comprises at least one of:

determining an adjusted input/output operations per second (IOPS) based on the I/O utilization, a current IOPS of the storage system, and a first expected buffering parameter, wherein the first expected buffering parameter indicates an extent to which the IOPS is changed; or determining an adjusted I/O throughput based on the I/O utilization, a current I/O throughput of the storage system, and a second expected buffering parameter, wherein the second expected buffering parameter indicates an extent to which the I/O throughput is changed.

16. The electronic device according to claim 11, wherein the actions further comprise:

determining that the determined I/O utilization is less than a current I/O utilization; and in response to determining that the determined I/O utilization is less than the current I/O utilization and based on the determined I/O utilization, determining that the I/O capacity of the storage system at the first time instance comprises:

determining, based on the determined I/O utilization and the current I/O capacity of the storage system, an I/O capacity of the storage system for the future time period.

17. The electronic device according to claim 11, wherein the actions further comprise:

adjusting the adjusted I/O capacity of the storage system back to a default I/O capacity after a spike of the I/O utilization.

18. The electronic device according to claim 11, wherein the actions further comprise:

selecting a corresponding disk in the storage system, wherein the corresponding disk is of a type that satisfies the I/O capacity; and taking an I/O capacity of the selected disk as the I/O capacity of the storage system at the first time instance.

19. The electronic device according to claim 11, wherein adjusting the performance of the storage system based on the determined I/O capacity comprises:

selecting a first disk in the storage system; and adjusting an I/O performance of the first disk to be the same as the I/O capability; and wherein the actions further comprise:

selecting a second disk in the storage system, wherein the second disk is different from the first disk; and adjusting an I/O performance of the second disk to be the same as the I/O capability.

20. A computer program product that is tangibly stored on a non-transitory computer-readable medium and comprises computer-executable instructions, wherein the computer-executable instructions, when executed by a device, cause the device to perform a method, the method comprising:

generating a machine learning model based on historical operation data of a storage system, the storage system being used for backing up and restoring data in a client;

determining, by the machine learning model, input/output (I/O) utilization of the storage system for a future time period;

determining, in response to determining that the I/O utilization exceeds a predetermined threshold at a first time instance in the future, an I/O capacity corresponding to the determined I/O utilization based on the determined I/O utilization; and adjusting the performance of the storage system based on the determined I/O capacity.

* * * * *